UNITED STATES PATENT OFFICE.

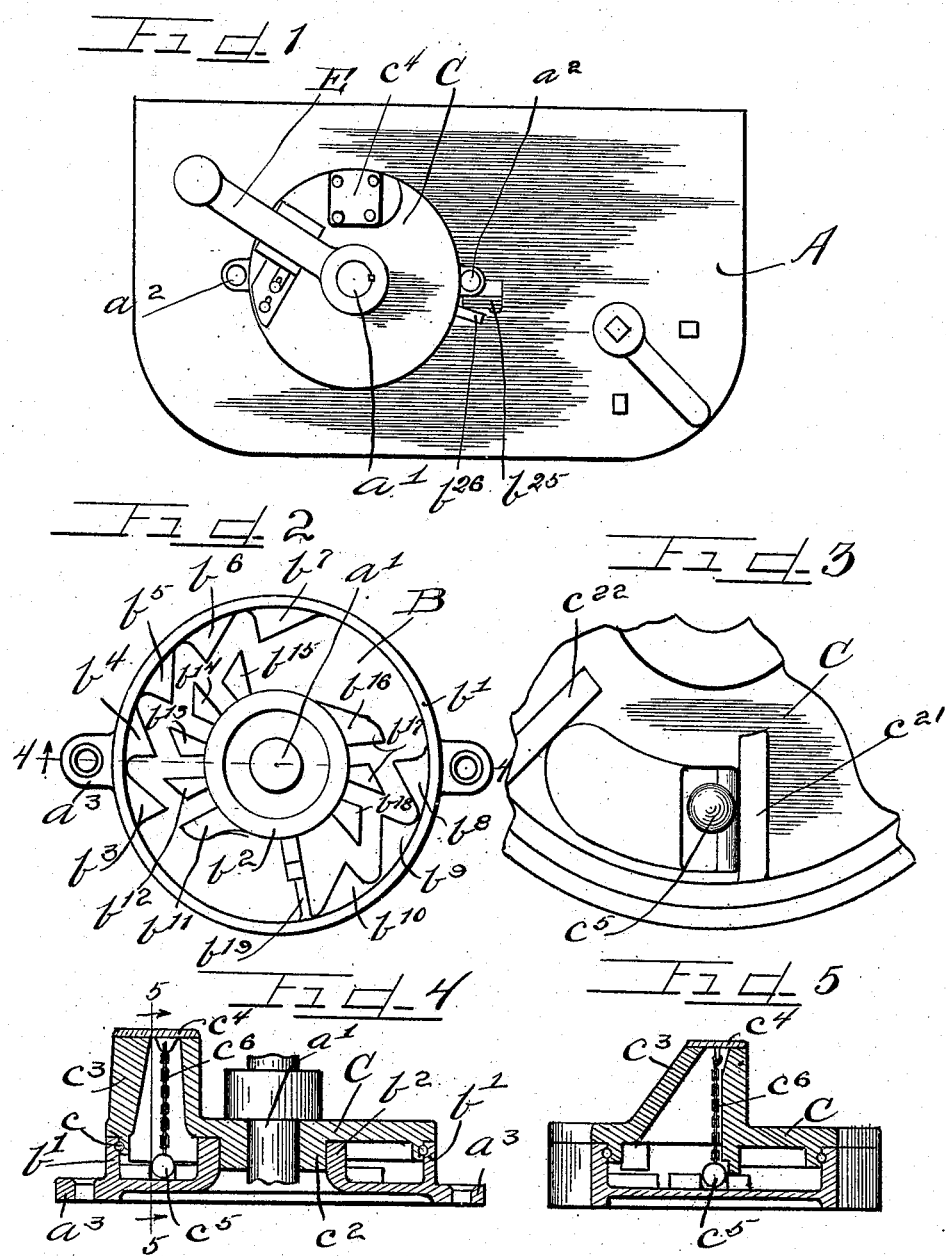

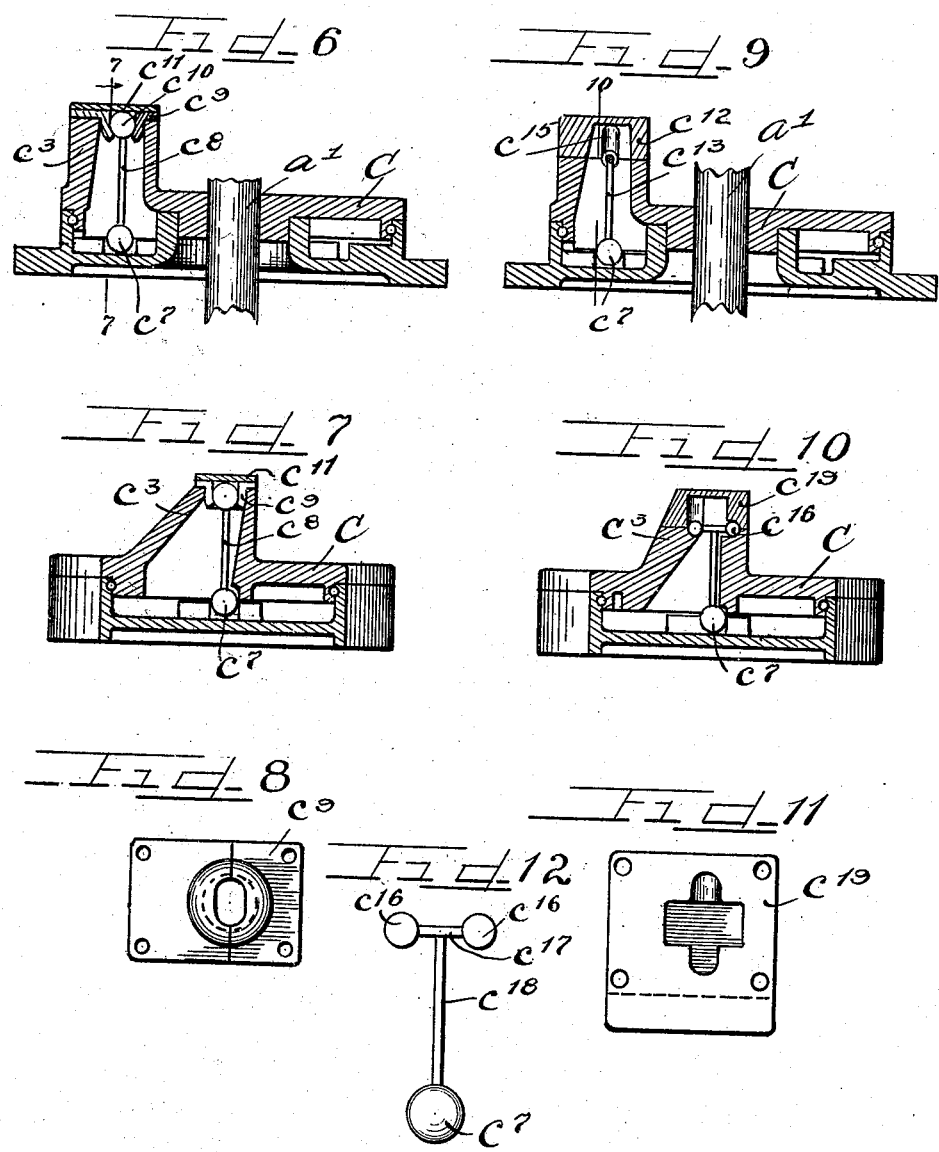

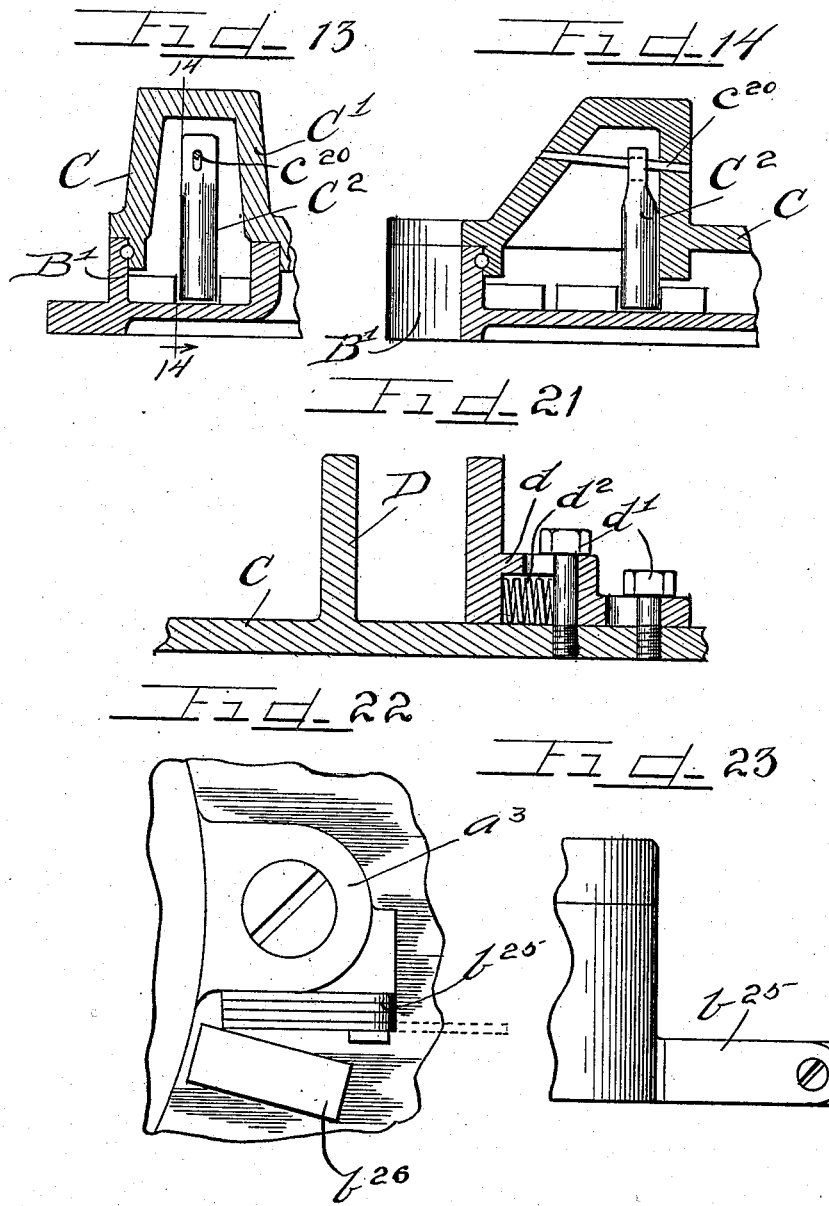

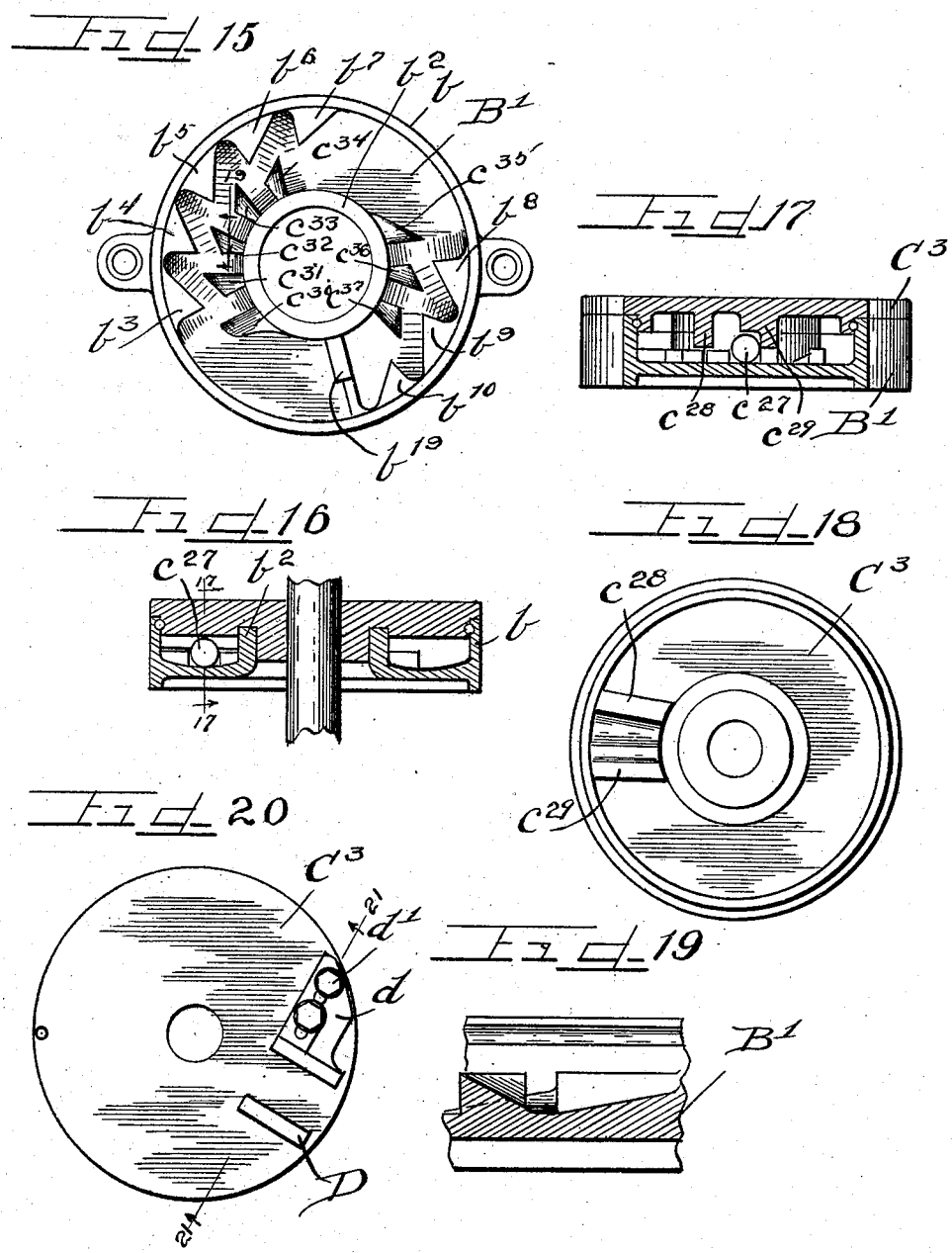

WILLIAM P. COSPER, OF CHICAGO, ILLINOIS, ASSIGNOR TO LORD ELECTRIC COMPANY, OF BOSTON, MASSACHUSETTS, A CORPORATION OF MASSACHUSETTS.

ELECTRIC CONTROLLER.

No. 915,719.　　　　　Specification of Letters Patent.　　　　Patented March 16, 1909.

Application filed June 27, 1907. Serial No. 380,998.

*To all whom it may concern:*

Be it known that I, WILLIAM P. COSPER, a citizen of the United States, and a resident of Chicago, Cook county, Illinois, have invented certain new and useful Improvements in Electric Controllers; and I do hereby declare that the following is a full, clear, and exact description of the same, reference being had to the accompanying drawings, and to the characters of reference marked thereon, which form a part of this specification.

In controlling electric motors it is customary to connect in the circuit a variable resistance and to cut out the resistance as the self induction of the armature windings is overcome in order that the insulation of the motor may not be burned out by suddenly sending a large current through the motor. This is important with all motors and related devices particularly so of course, with motors which receive large currents for in these if the resistance in the motor circuit be cut out at too rapid a rate or before the self induction of the windings has been overcome, a sufficiently large current may be turned on to burn the motor out or seriously injure it. Even though the motor be uninjured by such sudden turning on of the current a large part of the current must of necessity be wasted, thus in the one case causing large expense for repairs and in any event causing considerable waste of current. While all this is true of all electric motors and certain other electrical devices it is more particularly true perhaps of street railway motors where the operators are usually quite ignorant of the damages that may be occasioned by careless operation. As a result of such ignorance or carelessness such operators in starting a heavily loaded car usually, if possible, turn on the entire force of the current immediately. Many devices have been constructed to prevent this method of operation but with most of these devices heretofore though several seconds are required for moving from one to the other extreme limit of position on the controller, by one inexperienced in the operation of the motor, practice enables these operators very soon to shift the starting lever from one to the other extreme position in a mere fraction of the time intended for that movement and in consequence most of the devices intended for the purpose of motor control have proven more or less unsatisfactory.

It is an object of this invention to provide an electric controller or timing device for turning on motor currents by the use of which the most skilled operator will be unable to turn on the current faster than the motor should safely and properly receive the same and to afford a gravity regulated timing element concealed within the mechanism and which cannot be made to turn faster than the requirements of the motor demand.

It is a further object of the invention to afford a construction wherein a gravity acting timing element oscillates on each side of a center support to alternately check and to permit movement of the controller lever and by means of which, though a definite period of time is necessary to turn on the current the current may be instantly cut off if desired by reversing.

It is further an object of the invention to afford an exceedingly cheap, simple, durable and accurately operating timing element, adapted to be used with any standard motor controller heretofore constructed.

The invention consists of the matters hereinafter described and more fully pointed out in the drawings.

As shown in the drawings: Figure 1 is a top plan view of a controller provided with timing mechanism embodying my invention. Fig. 2 is a top plan view of the timing mechanism with the cover and handle removed and showing only the stationary element. Fig. 3 is an enlarged fragmentary bottom plan view of the cover. Fig. 4 is a section on line 4—4 of Fig. 2. Fig. 5 is a section on line 5—5 of Fig. 4. Fig. 6 is a section similar to Fig. 4 and illustrates a slight modification of the gravity acting timing element. Fig. 7 is a section on line 7—7 of Fig. 6. Fig. 8 is a top plan view of a supporting plate for one of the gravity acting timing elements. Fig. 9 is a view similar to that shown in Figs. 4 and 6 and illustrates a slightly different support for the gravity acting timing element. Fig. 10 is a section similar to Fig. 7 and illustrates further modification of the gravity acting timing element. Fig. 11 is a top plan view of the supporting plate for the gravity acting timing element illustrated in Fig. 10. Fig. 12 is an enlarged detail of the gravity acting timing element shown in Fig. 10. Fig. 13 is an enlarged fragmentary section illustrating another method of supporting the gravity acting timing element. Fig. 14 is a section on line 14—14 of Fig. 13. Fig. 15 is a top plan view of the stationary element for the timing mechanism showing the same provided with a radially concave floor upon which the gravity acting timing element may roll. Fig. 17 is a section on line 17—17 of Fig. 15. Fig. 16 is a central transverse section of the same. Fig. 18 is a bottom plan view of the cover plate for the construction shown in Figs. 15 to 19 inclusive. Fig. 19 is an enlarged fragmentary section taken on line 19—19 of Fig. 15 to illustrate the concave construction of the bottom of the stationary elements. Fig. 20 is a top plan view of the cover provided with means for adjusting the operating handle accurately with reference to the timing elements. Fig. 21 is an enlarged sectional detail of the same. Fig. 22 is an enlarged fragmentary detail illustrating the means for adjusting the stationary timing element relatively the controller before rigidly attaching the same to the top thereof. Fig. 23 is a fragmentary side elevation thereof.

As shown in the drawings: A indicates an electrical controller of any preferred kind and $a'$ the commutator shaft which extends upwardly therethrough. Rigidly secured on the top of the controller as shown by bolts $a^2$ which extend downwardly through laterally disposed lugs $a^3$ and engaged in the top of the controller is the stationary timing element B. As shown, said stationary timing element comprises a circular casing or housing of cast metal or any suitable material provided about its periphery with a raised flange $b'$ and provided with a central aperture extending through the bottom thereof for the commutator shaft $a'$. As shown also a flange $b^2$ surrounds said central aperture affording a central guide for the rotating cover C. Within the bottom of said stationary timing element and integral with the bottom and the outer flange $d'$ are inclined ratchet teeth $b^3$ to $b^{10}$ inclusive, five of which are secured on the left side of said element and three of which, as shown, are on the right side thereof. Said teeth project inwardly affording radially directed faces on the rear sides thereof (or that toward which the cover rotates in turning on the current) and obliquely inclined faces on the opposite sides thereof. Integrally connected with the inner flange $b^2$, are ratchet teeth $b^{11}$ to $b^{18}$ inclusive all of which have as shown in Figs. 2 and 15, straight front faces directed at a slight angle to the radius and all of which excepting the teeth $b^{11}$ and $b^{16}$ afford shorter rear faces also directed at a slight angle to a radius. Said teeth being spaced between the teeth $b^3$ to $b^{10}$ and each of said teeth excepting the teeth $b^{11}$ and $b^{16}$ having obliquely inclined ends. Said teeth are so arranged relatively to $b^3$ to $b^{10}$ as to afford a narrow tortuous or zig zag passage extending around said stationary element between said teeth and, the rear faces of the outer teeth being in approximately the same plane as the rear faces of the inner teeth, the radially directed slots between the inner teeth afford radial extensions of said passage so that a succession of radial branches to said tortuous passage are provided extending from flange to flange. The teeth $b^{11}$ and $b^{16}$ have obliquely and forwardly inclined faces and as shown in Figs. 2 and 15, and integrally secured in the bottom of said stationary element is a radial rib or stop $b^{19}$ which projects upwardly therein. Rotatably secured on the top of said stationary element is the cover C which as shown, fits partly within the flange $b'$ and is provided with a groove to afford one portion of a ball race and registers with a corresponding groove in the flange $b'$ and contains the balls $c$ and affording an anti-friction bearing for said cover. Said cover is also provided with a central aperture therethrough to receive the commutator shaft and with a downwardly directed hub $c^2$, which fits within the flange $b^2$ of the stationary element. On one side of said cover as shown in Figs. 1, 4, 5, 6, 7, 9, 10, 13 and 14 is provided a raised hollow turret $c^3$ which as shown in Figs. 1 to 10 is open at the top and is adapted to be closed at its top by a plate $c^4$, as shown in Figs. 4 and 5. Secured to and depending from said plate is a gravity acting timing element which as shown in Figs. 4 and 8 is in the form of a pendulum and comprises a ball $c^5$, supported on the chain $c^6$. Said ball is of a diameter to permit the same to readily pass through the tortuous channel in the stationary element and between said ratchet teeth and to swing radially in the radial slots therein by gravity, after being impelled laterally by the inclined faces of the teeth.

In the construction shown in Figs. 6 and 7 the pendulum comprises a ball $c^7$, supported upon a rod $c^8$, from a plate $c^9$ secured at the top of the turret $c^3$, by means of the ball-shaped head $c^{10}$, which fits in a suitable socket in said plate $c^9$, affording a ball and socket joint. As shown a cover plate $c^{11}$ is provided which is rigidly bolted on the top of the turret to cover said joint.

The construction shown in Fig. 9 is similar to that shown in Figs. 6 and 7 with the exception that the pendulum ball $c^7$ in this case is supported to swing from a removable cap $c^{12}$ bolted to the top of the turret and any suitable flexible connection is provided for the stem or bar $c^{13}$ on which the ball is supported. As shown a roller $c^{15}$, is supported in said cap to enable the pendulum to swing.

The construction shown in Figs. 10, 11 and 12 is substantially the same except that the ball $c^7$ is supported from the top of the turret by means of ball bearings $c^{16}$, said balls $c^{16}$ being connected by means of a horizontal bar $c^{17}$ at the center of which the stem $c^{18}$ is connected. As shown a cover plate $c^{19}$ is bolted on the top of the turret and affords positive seat for the inner of said balls $c^{17}$ while the other or that supported on the opposite or front edge of the turret is provided to rest in a recess in the cover plate as shown in Figs. 10 and 11, thus enabling the pendulum to swing radially of the fixed element and permitting the forward ball to be raised as the pendulum is drawn backwardly over the teeth in reversing. In the same manner in the turret $C'$ the top of which is closed a pendulum $C^2$ is supported to swing radially of the fixed element or casing. For this purpose a cylindric rod $c^{20}$ is secured in the turret as shown in Figs. 13 and 14 to permit said pendulum to swing radially thereon and as shown the forward end of said rod $c^{20}$ inclines upwardly at a slight angle, said pendulum bar $C^2$, is provided with a slotted aperture in its upper end to engage on said rod to permit the lower end thereof to swing upwardly over the teeth as the mechanism is turned back to neutral in reversing. As shown, on the under side of said cover and closely adjacent the normal position of the pendulum ball when at rest, is a radial downwardly directed rib $c^{21}$ adapted normally to bear against the pendulum and to push the same forward as the cover is rotated in advance thereof as shown in Fig. 3 and a corresponding rib $c^{22}$ which is positioned sufficiently in advance of the upward swing of the pendulum to permit the pendulum to be readily drawn back over the teeth in reversing. On the top of the cover C or $C^3$ is provided a radial rib D, integral with the cover, and an adjustable bracket $d$ having its face parallel with the rib. Said bracket is secured to the cover by means of stud bolts $d'$, which passes through slotted holes in said bracket and engage in the cover. In the under side said bracket is a recess in which is a spring $d^2$, which bears against one of said bolts and against a fixed part on the bracket and acts to force the bracket toward the fixed rib D. This permits the shank of the handle E to be firmly engaged between said rib and bracket when the inner end is secured on the commutator shaft even though the shanks of the handles may not always be of exactly the same width.

The operation is as follows: The adjustment of the fixed timing element may be very accurately effected relatively the casing of the controller by the construction shown in Figs. 1, 22 and 23, in which, one of the lugs $a^3$ of said fixed element has pivotally engaged thereon at one side thereof a plurality of plates of thin metal $b^{25}$ adapted to engage between said lug and the fixed rib $b^{26}$ on the top of the commutator. Having clamped the timing mechanism on the top of the controller casing said mechanism is turned sufficiently to secure the proper relative adjustment of said mechanism with the various resistances in the controller and having secured the proper adjustment a sufficient number of said plates are thereby jammed between the lugs $a^3$ and $b^{26}$ as shown in Fig. 22 to hold the parts in relative position until the top of the controller casing may be drilled and tapped to receive the stud bolts thus insuring absolute accuracy of the adjustment. In operating the timing mechanism forward rotation of the cover in turning on the current carries the gravity acting timing element or pendulum forwardly along the inclined tooth $b^{11}$ swinging the same outwardly until the ball is engaged between the tooth $b^3$ and the rib $c^{21}$, on the cover thereby arresting further forward movement. The operator then of necessity slightly reverses the movement of the cover when gravity swings the pendulum ball readily into the radial open slot between the teeth $b^{11}$ and $b^{12}$ and past the center of gravity again locking from movement and necessitating swinging the ball several times to bring the same again in register in the passage between the teeth $b^{12}$ and $b^3$. The forward movement of the cover again swings the pendulum ball outwardly along the passage to engage the tooth $b^4$, necessitating a second release followed by a radial swinging of the pendulum and in the same manner at each forward movement each successive tooth blocks the movement and necessitates release and requires an interval of time determined by gravity before more current can be turned on. In this manner a definite timing effect may be secured the interval between successive movements being determinable by the laws of the pendulum. In the same manner the teeth $b^8$ to $b^{10}$, and $b^{16}$ to $b^{18}$ act to control the turning on of the current or cutting out of resistance until the pendulum is engaged at the forward limit of movement.

Reversal may be instantaneously effected inasmuch as the pendulum ball may be readily drawn over said teeth when the rotation of the cover is reversed there being a sufficient open space at the bottom of the turret to permit the pendulum to swing upwardly to the necessary extent. In the construction shown in Figs. 13 and 14 the operation is as before described with the exception that on reversing, the pendulum slides to the upper end of the rod $c^{20}$ and being slotted for the reception of said rod the lower end swings freely upward to be drawn over the teeth and furthermore as the lower end of the pendulum is engaged between the teeth and the rib $c^{21}$ on the cover the upper end is in each instance thrown slightly forward on the rod to slide back again during the swing of the pendulum, this affording an additional retardation.

Of course instead of swinging from the top of the turret the gravity acting element may roll radially of the fixed element in timing as shown in Figs. 15 to 19 providing the bottom of the fixed element B′ be shaped as shown in said figures to afford a considerable radial incline for that purpose. As shown the bottom of said element is radially concaved between the flanges $b$ and $b^2$ the lowest point in the channel being between the teeth on opposite sides of the channel as shown in Fig. 19 and the teeth $c^{30}$ to $c^{37}$ inclusive on the forward side being inclined to permit the ball $c^{27}$ to be readily drawn rearwardly thereover by means of the rib $c^{28}$ which is in advance of the ball. The operation in this construction is as before described, the rib $c^{29}$, pushing the ball forwardly along the inclined teeth and up the inclines into radial engagement of the outer teeth and permitting the ball to roll down the incline and into the slots between the inner teeth again requiring release until at last the ball comes to rest at the bottom of the concave channel in register with the passage permitting further forward movement repeating its oscillations until the current is fully turned on. In reversing the depending rib $c^{28}$ on the inner side of the cover engages behind the ball pulling the same over the inclined teeth $c^{30}$ to $c^{37}$ to the rearwardly limited reversal. In this construction also it is obvious that the movements of the ball radially of the fixed element must be in accordance with the laws of the pendulum and as a result the regulation for timing the turning on of the current may be effected by suitably constructing the inclines.

Of course though I have shown several embodiments of my invention the illustrations and specifications herein contained are intended to be merely illustrative as to the application of gravity control in accordance with the laws of the pendulum and the result of course may be effected in numerous ways. I therefore do not purpose limiting this application for patent otherwise than necessitated by the prior art as many changes may be made without departing from the principles of this invention.

I claim as my invention:

1. A timing element for electrical controllers embracing fixed element affording therein a tortuous passage around the commutator shaft and a gravity operated intermittently advancing element supported to oscillate a plurality of times before each advancement in passing through said passage and adapted to be locked from movement between successive oscillations.

2. In a device of the class described a pendulum adapted to swing radially of the commutator shaft and oppositely facing teeth all but one locking the pendulum from forward movement for a timed interval.

3. In a device of the class described a stationary timing element having a tortuous passage around the same, a rotatable cover secured thereon, a pendulum mounted to swing radially and transversely said passage and movable forwardly with the cover, and adapted to intermittently block forward movement thereof, necessitating a timed release, a stop integral with the stationary timing element to indicate neutral position and lugs integral with the cover, one adapted to engage the pendulum in advancing to prevent the pendulum swinging upwardly, and the other spaced a suitable distance to permit the pendulum swinging upwardly in reversing.

4. In a device of the class described a timing element embracing a base having a tortuous passage therein, a pendulum adapted to swing across and beyond said passage and means intermittently advancing the pendulum along said passage.

5. In a device of the class described a rotatable cover, a pendulum swung thereon to oscillate radially thereof and a stationary timing element having a tortuous passage therein along which the pendulum travels and having branches radial of the cover in which the pendulum swings beyond the passage.

6. A timing element comprising a base having a tortuous channel therearound and closely arranged branches of the passages on the inner side thereof and an oscillating gravity acting timing element positively impelled along said passage and alternately advancing and oscillating across the passage.

7. A device of the class described comprising a base having oppositely directed teeth having inclined faces, and affording a passage therebetween and radial passages between the inner teeth, a cover on the base, a downwardly directed rib thereon, a radially oscillating element impelled along the channel between the teeth in turning on current and to be drawn over the teeth in reversing.

8. A timing device embracing a rotatable element, a rigid element, a swinging timing member pivoted to one of said elements, teeth integral with the other of said elements providing a tortuous passage therearound for said member and providing passages at suitable intervals apart into and out of each of which the timing member must swing before each advancement of the rotatable element.

9. A base having inner and outer teeth having approximately parallel radial faces to afford stops, an inclined passage passing between the teeth, and a pendulum having a ball shaped head having to swing radially to block progressive movement by engaging both the inner and outer teeth.

10. In a device of the class described a casing having a passage therearound, oscillating means adapted to intermittently advance in the passage and means preventing said oscillating means advancing until a plurality of oscillations have been made.

11. In a timing device a base, a rotatable element, oscillating means carried by the rotatable element and said base having a passage therearound for the oscillating means to intermittently advance along and shaped to necessitate the oscillating means oscillating a plurality of times before each advancement therealong.

12. In a timing device a base, oppositely disposed teeth integral therewith providing a passage around the base and having alined approximately radial rear faces and means adapted to intermittently advance along the passage and adapted to engage the alined faces of the teeth to prevent advancing until after making a plurality of oscillations.

13. In a device of the class described a base, a rotatable element thereon and oscillating means rotatable therewith, said base provided with a passage along which the oscillating means intermittently advances and radial passages into which the oscillating means swing, past the other passage.

14. A timing element embracing a base having a passage therearound, an oscillating pendulum and teeth on the base providing radial passages into which the pendulum swings and each tooth after the first having an approximately radial rear face necessitating the pendulum swinging out of the radial passage before each advancement.

15. A timing device embracing a base, an oscillating timing element, concentric sets of teeth providing a passage around the base along which the timing element advances and the inner set of teeth providing passages therebetween into the appropriate one of which the oscillating element swings, a plurality of times before each advancement.

16. In a device of the class described a base plate, concentric flanges integral therewith, a rotatable cover, a pendulum depending from the cover, teeth secured to the outer flange having radially directed rear faces and inclined front faces and teeth integral with the inner flange having approximately radial front and rear faces and an inclined face connecting said radial faces and said inclined faces of the teeth of the inner and outer flanges providing therebetween a passage for the pendulum.

17. In a timing device a base plate, upwardly directed inner and outer flanges integral therewith, a set of teeth integral with each flange, the appropriate teeth of the sets having their rear faces approximately in alinement, said teeth providing a passage between the ends thereof and the teeth of the inner flange providing passages extending inwardly past the passage between the sets of teeth, a cover rotatable on the base and intermittently advancing oscillating means depending therefrom adapted to swing into the passages between the inner sets of teeth before advancing along the passage between both sets of teeth.

18. In a timing device a casing, oppositely directed sets of teeth therein providing a passage therebetween and the teeth of one set providing passages extending inwardly beyond the aforesaid passage and timing means adapted to intermittently advance in the passage between both sets of teeth and oscillating a plurality of times in the appropriate inward passage before each advancement.

19. A timing element comprising a casing, a rotatable cover thereon provided with a turret, a pendulum in the turret, teeth in the casing shaped to provide therebetween a passage around the casing, in which the pendulum intermittently advances and said teeth providing passages extending past the aforesaid passage and in which the pendulum must oscillate a plurality of times before each advancement in the passage around the casing.

20. A timing element comprising a base provided with a passage therearound and passages at suitable intervals apart extending inwardly across and beyond said passage, a rotatable element and a pendulum carried thereby adapted to advance in the first named passage after oscillating or swinging into and out of the appropriate cross passage.

21. A timing device comprising a rotatable element, an oscillating pendulum and a base provided with a tortuous passage therearound along which the pendulum is adapted to intermittently advance, and the base provided with passages at suitable distances apart extending inwardly past the tortuous passage into which the pendulum swings thereby necessitating the pendulum swinging out of the same before each advancement in the tortuous passage and timing the movement of the rotatable element.

22. A timing device comprising a rotatable element, oscillating means carried thereby having a pivotal connection therewith, a rigid base, teeth thereon shaped to provide a winding passage along which the oscillating means is adapted to advance and part of the teeth shaped to provide passages extending inwardly beyond the winding passage to receive the oscillating means for retarding for timed intervals the advancement of the rotatable element.

23. A timing device comprising a rotatable element a pendulum rotatable therewith, a rigid element and oppositely disposed sets of teeth integral with said rigid element providing a winding or tortuous passage therebetween along which the pendulum advances and the teeth on each side of the passage adapted to lock the pendulum from advance movement.

24. In a timing device a rotatable element, a pendulum movable therewith, a base plate and oppositely disposed teeth providing a passage for the pendulum and the teeth on both sides of the passage adapted to block advance movement of said pendulum.

25. A device of the class described comprising an oscillating element, a base plate provided with an inner and an outer flange, teeth integral with each flange providing a passage therebetween and the teeth of each flange shaped to prevent forward movement of the pendulum except part of the teeth of the inner flange.

26. In a timing device an oscillating pendulum, a rotatable element supporting the same, a rigid plate, an outer series of teeth each tooth shaped to prevent forward movement of the pendulum, an inner series of teeth each shaped to prevent forward movement of the pendulum except the one first engaged by the pendulum in starting from neutral position and the two series of teeth providing a passage therebetween for the pendulum.

27. A timing element comprising a plate, oscillating means movable around the plate and teeth arranged on each side of and providing a tortuous passage in which the oscillating means is adapted to advance and each tooth on each side the passage except two adapted to engage the pendulum and prevent advance movement thereof for a timed interval.

28. A timing element comprising a casing having a passage therearound, a rotatable cover for said casing, a pendulum carried thereby adapted intermittently to advance along the passage and means on each side of the passage adapted to engage and prevent advance movement of the pendulum thereby necessitating the pendulum coming approximately to rest before each advancement.

29. A controller comprising a casing, a cover rotatably engaged thereto, a pendulum carried by the cover, a stop in the casing adapted to engage the pendulum in neutral position, teeth in the casing providing a passage for the pendulum and the teeth on each side of the passage adapted to prevent forward movement of the pendulum except the tooth nearest the stop which has an inclined face to adjust the pendulum to engage the first tooth of the opposite side of the passage.

30. A timing device comprising a base plate, a stop therein indicating neutral position, concentric flanges on the base plate, a cover rotatably on said base plate, a hub integral therewith engaged within the inner flange of the base plate, a flange integral with the cover fitting within the outer flange of the base, a pendulum movable with the cover, said base plate having a passage therearound, teeth positioned on both sides of the passage adapted to prevent the pendulum from advancing when contacting the same and teeth engaged to the inner flange inclined to permit the pendulum passing therealong.

31. In a device of the class set forth a suitable base provided with a tortuous passage therearound, a pendulum adapted to advance along the tortuous passage and said base provided with inwardly directed passages communicating with the tortuous passage at suitable distances apart into and out of each of which the pendulum swings prior to advancing therepast.

32. In a device of the class described a casing, provided with an irregular passage therearound and having passages communicating with said irregular passage at different points and a pendulum adapted to advance along the irregular passage and adapted to drop or swing by gravity into each of said communicating passages before advancing therepast thereby timing the movement of the pendulum.

33. In a device of the class described a pendulum, a casing provided with a passage along which the pendulum is adapted to advance and also provided with passages communicating with the aforesaid passage each of which is adapted to receive the pendulum therein and prevent advancement thereof for a timed interval.

34. In a timing device a pendulum, a base plate provided with a tortuous passage therearound in which the pendulum advances and provided with passages each adapted to prevent advance movement of the pendulum for a timed interval and means for adjusting the base plate to vary the interval of time between advancements.

35. In an electric controller, an oscillating pendulum, a base provided with a passage along which the pendulum advances and provided with passages to retain the pendulum for a timed interval and means for varying the length of time the pendulum is retained in said passages.

36. A timing device comprising a rigid element, a rotatable timing element, oppositely disposed teeth integral with one of the elements providing a passage therebetween and said oppositely disposed teeth provided with abrupt faces on the same side, each for preventing advance movement of the timing element.

37. In a timing device a rigid element, teeth integral therewith providing a passage therebetween and part of the teeth having alined abrupt faces and a pendulum adapted to engage the abrupt face of a tooth on one side of the passage and the abrupt face of a tooth on the opposite side of the passage before each advancement in the passage.

In testimony whereof I have hereunto subscribed my name in the presence of two subscribing witnesses.

WILLIAM P COSPER.

Witnesses:
J. W. ANGELL,
K. E. HANNAH.